United States Patent [19]

Mahadev et al.

[11] Patent Number: 5,030,437

[45] Date of Patent: Jul. 9, 1991

[54] CATALYTIC REMOVAL OF SULPHUR-CONTAINING COMPOUNDS FROM FLUID STREAMS BY DECOMPOSITION

[75] Inventors: Kalabaeerappa N. Mahadev; Jamsheed P. Irani, both of Calgary; Harry E. Gunning, Edmonton, all of Canada

[73] Assignee: Budra Research Ltd., Calgary, Canada

[21] Appl. No.: 208,716

[22] Filed: Jun. 7, 1988

Related U.S. Application Data

[63] Continuation-in-part of Ser. No. 137,162, Dec. 23, 1987, abandoned.

[51] Int. Cl.$^5$ .................. C01B 17/04; C01B 17/06
[52] U.S. Cl. ..................... 423/576.8; 423/224; 423/571; 423/576.2
[58] Field of Search ............ 423/224, 230, 571, 573.1, 423/576.2, 576.8, 567 A

[56] References Cited

U.S. PATENT DOCUMENTS

| | | | |
|---|---|---|---|
| 2,559,324 | 7/1951 | Spillane | 423/571 |
| 2,559,325 | 7/1951 | Spillane | 423/542 |
| 2,979,384 | 4/1961 | Weiner et al. | 423/573.1 |
| 3,939,250 | 2/1976 | Michel et al. | 423/571 |
| 4,039,613 | 8/1977 | Kotera et al. | 423/571 |
| 4,438,218 | 3/1984 | Boorman et al. | 502/220 |

*Primary Examiner*—Jeffrey E. Russel
*Attorney, Agent, or Firm*—David J. French

[57] ABSTRACT

This invention provides a catalyst and method for removing sulphur compounds from a fluid stream and decomposing such compounds to produce sulphur. Sour natural gas can be sweetened effectively by this invention, and sulfur can be prepared thereby. The invention employs a catalyst containing an alkali metal sulfide and sulfides(s) or selenide(s) of metal(s) showing polyvalent and/or amphoteric character, e.g. Zn, etc. The catalyst is generally impregnated on a microporous type support (e.g., alumina) and is capable of providing reactive oxygen. Its activity is sustained by exposure to small amounts of oxygen either while decomposing the sulphur compound, or thereafter.

13 Claims, 1 Drawing Sheet

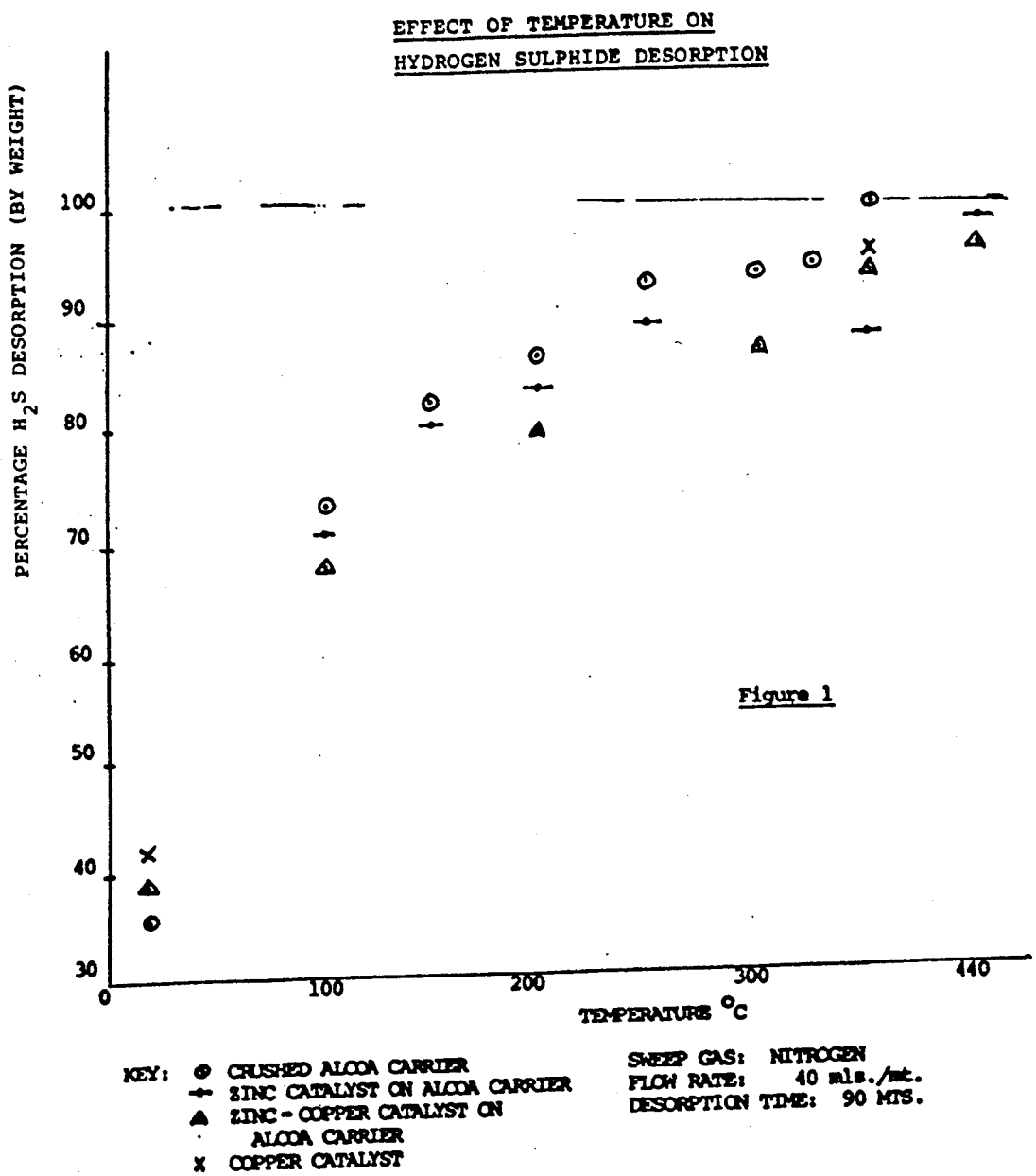

CATALYTIC REMOVAL OF SULPHUR-CONTAINING COMPOUNDS FROM FLUID STREAMS BY DECOMPOSITION

This is a Continuation-in-Part of application Ser. No. 07/137,162 filed Dec. 23, 1987, now abandoned.

FIELD OF INVENTION

The desirability of identifying an effective means for removing sulphur compounds from fluid streams will be readily appreciated. This invention comprises a novel method and catalyst for effecting such removal and the subsequent treatment of such sulphur compounds to produce elemental sulphur. More particularly this invention is applicable to the removal of hydrogen sulphide and other sulphur compounds from sour natural gas, and other fluid streams, and the conversion of the sulphur therein to elemental sulphur.

BACKGROUND OF THE INVENTION

Sulphur compounds are often considered to be undesirable compounds in gas mixtures and other fluid streams. The most common example of this is that of natural gas containing hydrogen sulphide. Natural gas may also contain as undesirable sulphur compounds, quantities of carbonyl sulphide, carbon disulphide, mono and dialkyl sulphides, alkyl-type disulphides and thiophenes.

The removal of such sulphur-containing compounds from gas streams has been addressed by a number of methods in the past. These methods generally rely on direct reactions with the sulphur compounds, or proceed to first separate the sulphur compounds from the gas stream by an absorption stage. In the latter case, the sulphur and other constituent elements of the absorbed compounds must then be extracted, if the absorptive medium is to be regenerated. A particularly desirable regenerative process would be one which produces elemental sulphur from the same reaction bed.

Various systems have been explored with the view of removing hydrogen sulphide from gas streams and producing elemental sulphur. The Claus process, as currently applied, is a complex multi-stage system involving the absorption of the hydrogen sulfide in an amine absorbent, followed by the burning of part of the hydrogen sulfide to sulfur dioxide, and subsequently reacting the hydrogen sulfide with the sulfur dioxide to produce the sulfur product.

It would be obviously desirable to provide a method for removal of hydrogen sulphide and other sulphur containing compounds from a fluid stream at ambient temperatures followed by the subsequent conversion at moderate temperatures of the sulphur compounds into elemental sulphur and other decomposition products.

OBJECTS OF THE INVENTION

It is therefore an object of the invention to remove sulphur compounds from a fluid stream and recover elemental sulphur therefrom. It is further an object to do so in the same reaction bed.

It is also an object of the invention to provide a catalyst which will allow removal and decomposition of hydrogen sulphide from a gas stream, and the separation of the sulphur so produced, at a modestly elevated temperature (circa 250° C.–600° C.).

These and other objects of the invention will become apparent from the description of the invention and claims thereto which follow.

SUMMARY OF THE INVENTION

This invention comprises a catalyst bed for absorbing hydrogen sulphide from a fluid stream and subsequently decomposing it into elemental sulphur. A suitable bed may comprise a microporous support adapted to accommodate or absorb hydrogen sulphide therein, which support contains or is capable of providing reactive oxygen, e.g. having peroxide-like characteristics and which further contains an alkali metal sulphide or selenide together with a sulphide or sulphides, (or selenide/s) of metals showing polyvalent and/or amphoteric character. (Amphoteric metals are those metals which show a capacity to react both with acids and bases.

The use of "and/or" in the above discussion, and throughout this disclosure, is to be taken in its non-exclusory sense. Thus, a mixture of both amphoteric and polyvalent compounds may be used in place of either alone, and a metal which is both amphoteric and polyvalent is intended to be included by this expression.

The reference to "reactive oxygen" is intended to refer to oxygen in an elevated energy state whereby the oxygen is available to react with the non-sulphur component of the compounds being treated so as to release sulphur.

This invention is also adapted to remove and decompose carbonyl sulphide, carbon disulphide, mono and dialkyl sulphides, alkyl-type disulphides, and thiophenes from a gas or liquid stream by contacting such a stream with the aforesaid catalyst bed.

Examples of amphoteric or polyvalent metal sulphides or selenides suitable for use in this invention include, amongst other, sulphides or selenides of metals from the group consisting of zinc, manganese, iron, copper, cobalt, aluminum, vanadium, molybdenum, tin and nickel as well as mixtures thereof. Examples of alkali metals suitable for use in this invention include lithium, potassium, sodium, cesium, and rubidium, as well as mixtures thereof.

One method of preparing the catalyst is by:
(a) preparing in aqueous solution a mixture of an alkali metal salt and a polyvalent and/or amphoteric metal salt;
(b) impregnating a support with the mixture described in (a) above;
(c) drying the support after it has been so impregnated;
(d) conditioning the impregnated support at ambient or higher temperatures by exposing it to a gas stream containing a reactive sulphur compound (such as hydrogen sulphide, carbonyl sulphide or carbon disulphide) which has the effect of converting the metal and alkali salts to sulphides;
(e) activating the impregnated support by heating it at an elevated temperature to drive off excess sulphur, so as to thereby form the finished catalyst.

The catalyst so prepared may be used directly by exposing it to a hydrogen sulphide gas stream. The prepared catalyst created after step (c) above may also be used by exposing it to such a stream and heating it, not necessarily simultaneously. This latter procedure will then automatically effect the initial conditioning of the catalyst. Thus, the first use of the catalyst to decompose hydrogen sulphide may complete the last two steps in the formulation of the catalyst, as described above.

This invention further comprises the production of elemental sulphur by exposing a gas stream containing hydrogen sulphide to the activated catalyst and then regenerating the catalyst by applying heat at a predetermined elevated temperature or temperatures (such as in the range of 250° C. to 600° C.) to such bed in the presence of a substantially non-reactive sweep gas. This will drive off hydrogen and elemental sulphur. Exposure of such bed to an unreactive sweep gas containing an amount of oxygen completes the regeneration process. Optionally, oxygen may also be provided during the initial treatment (at 250° C.–600° C.) either as an alternative to subsequent treatment with oxygen, or as well.

The amount of oxygen accompanying the sweep gas in the final step may range from a stoichiometric amount necessary to oxidize the absorbed compound to release elemental sulphur, up to a concentration of about 25%, although this is not necessarily limiting in all cases.

These and further features of the invention and its various aspects will be apparent from the description of the examples and test results set forth in the following.

SUMMARY OF THE FIGURES

FIG. 1 is a graph showing the effect of temperature on the desorption of hydrogen sulphide from a sample catalyst which has been saturated with hydrogen sulphide.

CHARACTERIZATION OF THE CATALYST

The active catalyst is believed to be characterized by a chemical having as its constituents a complex containing the combination of an amphoteric and/or polyvalent metal (hereinafter referred to as the "metal"), an alkali metal, (hereinafter referred to as the "alkalai"), sulphur or selenium and an active oxygen-containing moiety that contains an available reactive oxygen group. This complex should preferably be formed within a microporous support having a relatively high surface area and a microporosity adapted to receive the sulphur compound to be decomposed.

Alumina is considered a preferred support because of its high surface area. Also, it is believed that alkali metal incorporated into the support to form the active complex will react with alumina to form an alkali aluminate and facilitate bonding of the active complex to the carrier. Alumina may thereby provide an etchable substrate upon which active sites may be more readily formed.

The process of solvent extraction using methylene chloride, when applied to an activated catalyst containing manganese and potassium on alumina (Alcoa #S-100), showed the following extracted constituents:

| | |
|---|---|
| free manganous sulphide | −51% (by weight) |
| free potassium sulphide | −18% |
| other constituents including potassium aluminate and potassium hydroxide | −31% |

An attempt to utilize methanol on the same catalyst produced inconclusive results as the constituents were apparently modified by the methanol as a solvent (perhaps by hydrolysis of the manganous sulphide) as was indicated by a change in colour of the solution from green to brown shortly after extraction.

It has been found that the catalyst is capable of decomposing a small portion of absorbed hydrogen sulphide without the addition of oxygen during the decomposition heating phase. The activity of the catalyst under such conditions, however, declines rapidly. It is believed that the catalyst is intrinsically capable of supplying small amounts of oxygen, but that this capacity is rapidly depleted. This belief is supported by the observation that exposure of the catalyst to a reducing atmosphere causes catalytic activity to drop to virtually zero.

The provision of at least small amounts of oxygen to the catalyst, either while decomposition is occurring or upon regeneration of the catalyst has been found necessary to preserve or restore the activity of the catalyst. Thus while oxygen may be consumed in the decomposition cycle, it is readily restorable by exposure of the catalyst thereafter to free oxygen.

Preparation of the Catalyst—Method 1

Catalysts were prepared by two alternate methods. The first method commenced by dissolving a predetermined amount of the alkali sulphide (sodium or potassium) in water sufficient to form the ultimate desired loading on the support and optionally boiling the solution. To this solution a molar equivalent amount of an amphoteric and/or polyvalent metal sulphide was added and the solution was boiled again until the volume was reduced. Then the support (generally in the form of Alcoa alumina spheres, #S-100) which had been dried (by being heated to 250° C. for 4 hours) was added to the hot solution and mixed until all the solution was absorbed into the support. The partially prepared catalyst was then dried (using a nitrogen gas flow at 400° C.) and cooled. The catalyst was conditioned by exposure to a stream of 10% hydrogen sulphide in nitrogen or methane at ambient conditions until hydrogen sulphide was detected in the effluent and for at least one hour thereafter, and then by heating in a nitrogen gas flow at 400°–500° C. for a period of 2 to 4 hours to drive off free sulphur.

The partially prepared catalysts can also be conditioned by exposure first to a stream of 10% hydrogen sulphide in nitrogen or methane at 400°–500° C. for 4 hours and then to a stream of nitrogen or methane at 400°–500° C. to remove any excess sulphur. Some tests were run in which the conditioning gas was a 50/50 mixture of hydrogen sulphide and hydrogen and the active metal in the catalyst was manganese. This change in the nature of the conditioning gas considerably reduced its activity for the sample catalyst so prepared.

Preparation of the Catalyst—Method 2

A second method of preparing the catalyst was as follows. A sulphate, chloride or nitrate of a polyvalent and/or amphoteric metal was dissolved in an aqueous solution. The mixture was then heated to ensure rapid dissolution. (This, as above, is considered an optional step.)

The solution was then impregnated on a previously dried alumina support (Alcoa S-100, ¼ in. spheres) and the impregnated support dried.

A molar equivalent or greater amount of an alkali metal sulphide was then prepared in an aqueous solution and impregnated on the support. Again, heating was optionally employed to effect rapid dissolution.

The impregnated support was then heated to a temperature of 125° C. for a period of 2 hours in order to fix the active ingredients within the support. This was followed by a washing of the impregnated support with water until all available alkali sulphate, chloride or nitrate had been flushed from the support. The impregnated support was then dried at 125° C.

It is believed that at this stage most of the sulphate, chloride or nitrate originally impregnated has become converted to a sulphide of the amphoteric and/or polyvalent metal. The available sulphate, chloride or nitrate salts of the alkali metal were washed out of the support because they were not believed to contribute to the activity of the catalyst and were thought to reduce the availability of active sites within the support. The catalyst could be prepared without this step and still be capable of producing some decomposition of hydrogen sulphide. However, it is believed that the catalyst would generally show reduced activity without this step.

A stoichiometric amount of the alkali metal sulphide was then prepared in an aqueous solution and impregnated on the carrier. The impregnated support was finally dried at 125° C., and conditioned as described in Method 1.

Preparation of the Catalyst—Further Alternate Methods

The above process has been carried-out with a variety of amphoteric and/or polyvalent metals in the form of sulphates, chlorides or nitrates and, it is believed, may be carried-out with any soluble salts of such metals including zinc, iron, vanadium, copper nickel, molybdenum, aluminum and manganese. It is believed that an active catalyst would be produced when these methods are carried out with all amphoteric and/or polyvalent metals. It is further believed that these methods would be effective in producing an active catalyst whether sulphide or selenide salts of all amphoteric and/or polyvalent metals are used. Where less soluble compounds are employed, it may be appropriate to employ a basic aqueous solution in order to facilitate dissolution. A sufficiently basic solution can be created by adding alkali hydroxide to the solution of the amphoteric and/or polyvalent metal salt and boiling this mixture.

Method 2 described above has been followed using either sodium or potassium as the alkali element. It is believed that lithium, rubidium or cesium sulphides may also be substituted for the elements sodium or potassium, and still form an active catalyst using either methods.

It is further believed that selenium may be substituted for the sulphur in the alkali sulphide and still produce an active catalyst.

Based on sample tests, a satisfactory standard of performance for the catalyst in terms of both absorptive and decomposing capacity can be obtained with an approximate 1:1 molar ratio between the metal and alkali components, and a similar molar ratio where an alkali hydroxide is employed.

Absorptive capacity for hydrogen sulphide is maximized for various metal sulphides at different levels of impregnation of the support. For example this occurs between the 0.5% to 2.5% weight range for a catalyst incorporating a zinc sulphide/sodium sulphide mixture deposited by Method 1 on the Alcoa carrier (S-100 spheres).

Preparation of the Catalyst—Conditioning

The catalyst is activated by exposing it at ambient or higher temperatures to an unreactive gas containing hydrogen sulphide, followed by heat treatment in an unreactive sweep gas at a temperature of 250° C.–700° C. containing an amount of oxygen as referenced below. "Unreactive" is used here and throughout in the sense of a gas that does not substantially react in this system. Completion of activation can be evidenced by the ceasation of formation of downstream deposits of sulphur on cooling of the exiting sweep gas. It is most desirable that the activating gas streams not contain appreciable amounts of compounds or elements, such as hydrogen, which will have a major reductive effect on the activity of the catalyst. It is also important that the catalyst be exposed by the conclusion of the conditioning process to sufficient oxygen to ensure that reactive oxygen will be available within the catalyst.

Sweetening and Decomposition Procedure

The procedure followed to verify and quantify the production of sulphur from hydrogen sulphide was as follows.

A sample of catalyst that had been purged of free sulphur and hydrogen sulphide be regenerating it at 400° C. under an unreactive sweep gas (nitrogen or methane) and exposure to oxygen was weighed and then placed in a reaction tube. A measured volume of gas containing a known percentage of hydrogen sulphide was then passed over the catalyst bed at a specific temperature, usually ambient, to remove the hydrogen sulphide from the gas stream. This was designated as the "sweetening" cycle. The length of exposure was either that required to produce an indication of hydrogen sulphide "breakthrough" at the exit end (as measured by the blackening of standardized lead acetate paper, or other standard methods), or some lesser period of time. A run to breakthrough was said to have saturated the bed. A run carried to a point short of saturation was designated as a "partial run".

The catalyst bed in its tube was then weighed to determine either the saturation loading of the bed, or the partial loading of the bed, in terms of its absorption of hydrogen sulphide.

Throughout all experiments, the catalyst beds utilizing molecular sieves or alumina support showed a capacity in the foregoing sweetening phase of maintaining the hydrogen sulphide level in the out-flowing stream below the measurable threshold vis, 1 part per million prior to breakthrough.

The catalyst bed in its reaction tube was then put through the separation phase by exposing the catalyst bed to an unreactive sweep gas (nitrogen or methane) at a specific temperature for a period of time.

Although some decomposition initially occurs, in the absence of the addition of oxygen, the catalyst's decomposing capacity declines substantially. It has been found that this decline in efficiency may be overcome by utilizing a sweep gas containing a small amount (0.01 to 25%) of oxygen.

It has been found that with certain metals, such as manganese, that the catalyst deteriorates if exposed to excessive levels of oxygen, e.g. over 10%. This may, it is believed, be due to the formation of a sulphate. The catalyst in such a case was restored to activity on re-exposure to hydrogen sulphide. However, it is believed that the concentration of oxygen should preferably be limited in order to avoid such deleterious effects.

The sweep gas exiting the catalyst bed was caused to pass through a portion of the reaction tube that was maintained at room temperature. During this process, when carried out with the catalyst at temperatures over about 250° C., sulphur consistently condensed on the inside walls of a cooler, exit portion of the reaction tube in a condensation zone. Sample tests with glasswool placed downstream of such deposits indicated that further sulphur could not be collected by condensation from the cooled exiting gas stream beyond the condensation zone.

In most of the experiments the exiting sweep gas was analysed for hydrogen. Since the sweep gas supply was hydrogen-free, the hydrogen that was detected was determined to have originated from within the catalyst bed.

A further procedure followed in some experiments was to collect the exiting sweep gas and then determine its hydrogen and hydrogen sulphide concentrations. As further discussed below, little or no hydrogen sulphide was detected in the separation phase when the catalyst bed only partially loaded with hydrogen sulphide, well below the saturation level for the bed. For higher loadings and approaching saturation, much more hydrogen sulphide was detected in the separation stage of treatment.

After sulphur ceased to be forming further within the cooler portion of the reaction tube, the tube and bed were reweighed. Comparisons of this weight with the weight of the tube following sweetening showed that virtually all of the sulphur remained in the system, up to this point. Then heat was applied to the outside portion of the reaction tube where sulphur had deposited and the sweep gas flow was maintained. This procedure was continued until all of the sulphur in the reaction tube had been vaporized and carried out of the tube. The reaction tube and bed were then reweighed.

The catalyst bed was then put through the regeneration phase by performing the procedure described for the decomposition phase at 400°-500° C. for 2-4 hours. This step was shown through tests at higher temperatures to be capable of completely purging the catalyst bed of free sulphur and residual hydrogen sulphide.

The inclusion of small amounts of oxygen in the sweep gas during the regeneration phase was not found to be essential if it had been previously present as part of the earlier treatment. Apparently, if sufficient oxygen is available during the separation phase, then the catalyst is reactivated. However, no deleterious effects occurred where oxygen was present on regeneration as well and if insufficient oxygen was present during the separation phase, then oxygen should be supplied upon reactivation.

From the foregoing procedures calculations were made to determine the extent to which the hydrogen sulphide was converted to sulphur. The quantity of hydrogen sulphide absorbed in the catalyst bed was calculated based both on the gas flow rate, and on the gain in weight of the bed and tube during the sweetening phase. The quantity of sulphur produced was obtained from the heat-vaporization procedure. The actual quantity of hydrogen sulphide decomposed was also determined by the difference between the volume of hydrogen sulphide absorbed by the catalyst, and the volume of hydrogen sulphide collected by a gas bag during the regeneration. Of these methods, the mass of sulphur vaporized off the interior of the reaction tube was taken as the more reliable measure of the minimum decomposition that had occurred.

In a portion of the test runs a gas chromatograph ("GC") was installed on-line so that it could sample the gas flow exiting from the catalytic bed. Using the GC the presence of hydrogen could be positively detected. Since the test beds contained relatively small volumes of catalyst, hydrogen was evolved continuously over time in small amounts. Due to this and diffusion of hydrogen through the reaction tube walls, the GC was unable to accurately quantify the total amounts of hydrogen being released. The GC did confirm, however, the definite presence of hydrogen in the separation stage of testing.

Desorption Runs—Effects of Physical Absorption

From the results of the tests performed, it was determined that hydrogen sulphide was both physically and chemically absorbed within alumina based catalysts. Tests on a blank alumina support, containing no active ingredients, indicated that virtually all absorbed hydrogen sulphide could be driven out of such a support by heating it to 350° C. under a sweep gas for a period of time of 90 minutes. Supports that had been impregnated with ingredients to from the catalyst showed a tendency not to have released as much hydrogen sulphide at that temperature as did the blank support.

FIG. 1 shows this effect in which a blank Alcoa (S-100) alumina support is compared with catalysts prepared by Method 1 with Zinc and Potassium sulphide; Zinc, Copper and Potassium sulphides, and Copper and Potassium sulphides all on the same support. All beds were loaded to saturation and then treated in the separation phase for 90 minutes at various temperatures. FIG. 1 shows the percentage of the hydrogen sulphide evolved, as a function of temperature after heating for 90 minutes at various temperatures.

Table 1 summarizes the data depicted in FIG. 1 and adds the accumulated percent decomposition obtained both after the 90 minute heating at a constant temperature and after the final regeneration at 400° C. These percentages are based in both cases on conversion of sulphur, being the mass of sulphur vaporized divided by the mass of sulphur available in the quantity of hydrogen sulphide originally absorbed. Non-quantified but positive traces of hydrogen were shown by gas chromatography to have been released below 250° C. during the 90 minute heating stage, in all cases. In fact, hydrogen was detected with most other catalyst samples as evolving even at room temperatures. Since the sulphur did not start to come out until the temperature was in the 250° C. range or higher, this demonstrated that the hydrogen could be produced as a minor product separately from the production of sulphur.

TABLE 1

Effect of Heating at Various Temperature on Hydrogen Sulphide Desorption and Decomposition for Saturated Catalyst/Beds

| Catalyst/ Bed | Heating Temp (°C.) | % Desorption H₂S After Heating | % Sulphur Conversion After Heating | Total after Regeneration |
|---|---|---|---|---|
| Blank | 18° C. | 35 | — | — |
| Crushed | 100 | 73 | — | — |
| Alcoa | 150 | 82 | — | — |
| Support | 200 | 83 | — | — |
| #S-100 | 250 | 93 | — | — |
|  | 300 | 93 | — | — |
|  | 325 | 94 | — | — |
|  | 350 | 100 | — | — |
| Zinc - | 18 | 42 | — | 1.6 |
| Sodium | 100 | 70 | — | 7.8 |
| Sulphides | 150 | 80 | — | 10.3 |
|  | 200 | 83 | — | 17.2 |
|  | 250 | 90 | 1.6 | 10.2 |

TABLE 1-continued

Effect of Heating at Various Temperature on
Hydrogen Sulphide Desorption and Decomposition
for Saturated Catalyst/Beds

| Catalyst/ Bed | Heating Temp (°C.) | % Desorption H$_2$S After Heating | % Sulphur Conversion After Heating | Total after Regeneration |
|---|---|---|---|---|
| | 300 | 87 | 3.3 | 10.2 |
| | 350 | 88 | 7.0 | 7.5 |
| | 400 | 99 | 6.1 | 6.1 |
| Zinc | 18 | n/a | — | 2.6 |
| Copper - | | 68 | — | 14.7 |
| Sodium | 200 | 79 | — | 9.8 |
| Sulphides | 300 | 81 | 3.2 | 10.8 |
| | 350 | 94 | 5.3 | 6.3 |
| | 400 | 96 | 3.2 | 3.2 |
| Copper- | 18 | 42.1 | — | 8.2 |
| Sodium Sulphides | 350 | 95.7 | 1.1 | 1.5 |

(Heating Time: 90 minutes)

Partial Runs

The foregoing data on saturated catalyst beds give a clear indication that decomposition is occurring by the showing of elemental sulphur that is produced. However, the decomposition effect is being masked by the large proportion of hydrogen sulphide that is being physically absorbed, and then being desorbed without decomposing. The masking effect of physically absorbed hydrogen sulphide can be largely eliminated by exposing the catalyst to hydrogen sulphide streams for periods of time less than that necessary to saturate the bed. These are called "partial runs". In such partial runs, the amount of hydrogen sulphide evolved on regeneration was substantially reduced. Correspondingly, higher percentage figures for the amount of available sulphur in the hydrogen sulphide converted to elemental sulphur were obtained.

The catalyst, when used in association with microporous supports such as alumina or zeolite, rapidly absorbs hydrogen sulphide. It may be that the rapidity with which the hydrogen sulphide is absorbed permits the catalytic bed, at suitable flow rates, to saturate progressively when exposed to a sour gas stream. If the sweetening phase is terminated with only a portion of the bed exposed (and saturated) with hydrogen sulphide, then, as heat is applied to the bed in the presence of a sweep gas absorbed hydrogen sulphide that may be desorbed is swept into a region of the bed containing unexposed catalyst. Consequently, a bed that is partially loaded to saturation along only a portion of its length would be capable, in the separation phase, it is believed, of exposing virtually all of the hydrogen sulphide to chemical-absorption leading to decomposition.

Thus, on whatever basis, it has been found that with appropriately chosen partial loadings, it is possible to obtain virtually 100% dissociation.

Tested Catalyst Variants

The dissociative capacity of different catalyst formulations were tested and some of the results obtained were as set out in Tables 2 and 3.

TABLE 2

| CATALYST FORMULA (including method of preparation) | LOADING (gms/100 gms and as a % of saturation) | % SULPHUR CONVERTED (cumulative, at 400° C.) | HYDROGEN DETECTED (by GC) |
|---|---|---|---|
| Zn—K-1C-1 | 0.6(20%) | >90% | Positive |
| Zn—K-2W-1 | 0.7(23%) | >80% | Positive |
| Cu—K-1W-2 | 1.4(100%) | >70% | Positive |
| Mn—K-1C-1 | 0.6(20%) | >90% | Positive |

(Catalyst designation code:
Zn main amphoteric or polyvalent metal
k alkali metal
1C carrier:
1 - Alcoa
2 - ICI
c - crushed
w - whole
1 method of preparation
1 - method 1
2 - method 2 using a sulphate.)

The data in Table 2 provides quantitative figures on the extent of decomposition of hydrogen sulphide obtained, stated in terms of the percent conversion to sulphur.

Table 3 lists combinations of further ingredients all found to produce nonquantified but definite amounts of elemental sulphur upon the consecutive exposure of the catalyst to a 10% hydrogen sulphide/90% nitrogen gas stream at ambient temperature 18° C., followed by regeneration of the catalyst at temperatures ranging from 350°–400° C. as previously described. All runs were carried out using as a support the Alcoa alumina carrier No. S-100. All of the samples listed in Table 3 were prepared from sulphides in accordance with the procedure of Method 1.

The column entitled "Absorptive Capacity" indicates the percentage ratio of mass of sulphur absorbed to the mass of catalyst, at the point where the catalyst bed ceased to fully absorb further hydrogen sulphide (as tested by the darkening of lead acetate paper at the exit).

TABLE 3

| Metal | Alkali | Absorptive Capacity (% sulphur loaded per mass of catalyst) |
|---|---|---|
| Zinc | Sodium | 2.4 |
| Zinc | Potassium | 1.4 |
| Iron | Sodium | 2.4 |
| Vanadium | Sodium | 2.3 |
| Copper (I) | Sodium | 2.9 |
| Copper (II) | Sodium | 2.0 |
| Copper (II) | 2 Sodium | 2.4 |
| Copper (II) | Potassium | 2.2 |
| Nickel | Sodium | 2.9 |
| Molybdenum | Sodium | 2.3 |
| Aluminum | Sodium | 2.7 |
| Manganese | Sodium | 2.8 |
| Manganese | Potassium | 2.3 |
| Cobalt | Sodium | n/a |

Tested Catalyst Variants—Mixed Catalysts

A number of combined catalysts incorporating two or three amphoteric and/or polyvalent metals have been tested. Table 4 sets out the absorptive capacity at room temperature for all such catalysts based on the alumina support, Alcoa No. S-100. In all cases the catalyst was prepared by Method 1 using a sulphide of the metal as the initial salt. All components were incorporated into the support in equal molar ratios.

TABLE 4

| Metal Components | Alkali Component | Absorptive Capacity (gms sulphur equivalent from $H_2S$ in 100 gms catalyst) |
|---|---|---|
| Iron & Zinc | | 2.3 |
| Iron, Copper & Zinc | Sodium sulphide and Sodium hydroxide | 2.2 |
| Manganese & Zinc | Sodium sulphide and Sodium hydroxide | 2.0 |
| Manganese & Zinc | Sodium sulphide | 2.3 |
| Manganese & Nickel | Potassium sulphide | 1.5 |
| Manganese & Molybdenum | Potassium sulphide | 1.7 |
| Iron & Zinc | Potassium sulphide | 1.2 |

In all of the cases listed in Table 4, both sulphur and small amounts of hydrogen were observed to be evolved when the catalysts were regenerated at a temperature of 400° C.

Supports

The principal support used in testing has been alumina in the form of Alcoa ¼ inch spheres (#S-100). Other supports tested for absorptive capacity include alumina in the form of Norton 5/16" rings (#6573), Norton spheres (#6576); CIL Prox-Svers non-uniform spheres, Davison Chemical molecular sieves (type 13x, 4-8 mesh beads), silica and char. The Alcoa support was chosen as the preferred carrier due to its high absorptive capacity, which was due, in turn, to its large surface area (325 m²/gm), and its high affinity for absorbing hydrogen sulphide.

The Alcoa support referenced is essentially alumina that is reported as being in the gamma and amorphous form. It is not believed that the type of crystalline form in which the alumina may be found is of significance to the dissociative capacity of the catalyst.

Activity has been found where there is aluminum present in the support. The presence of aluminum in the support is relevant in that alumina will invariably be formed. When preparing the catalyst, the alkali metal will attack the alumina and form alkali aluminate and species containing available reactive oxygen. Thus the aluminum-containing supports inherently are capable of providing active centres necessary to support the activity of the catalyst. Such supports also provide an etchable base upon which actively catalytic sites are thought to be more likely to form.

Supports were tested for decomposition activity when aluminum was not present. A preferred showing of production of elemental sulphur occurred on repeated cycles of exposure of a catalyst formed on a silica support, to a continuous stream of 10% hydrogen sulphide in containing small amounts of oxygen. This was based upon manganese and sodium as the active metal and alkali respectively. Due to the reduced surface area of this latter carrier, only small amounts of sulphur were produced, and no quantitative measurements of decomposition were made. However, this test demonstrated that it is not essential that the support upon which the catalyst is based contain aluminum.

The capacity of the support to fully absorb hydrogen sulphide and/or other sulphur compounds is an important feature when it is desired to remove all significant traces of such compounds from a gas stream. This characteristic is believed to be dominated by the support itself. When the production of sulphur is the primary objective, the efficiency of absorption by the carrier is less critical. In such cases supports may be used that do not effect 100% absorption of hydrogen sulphide prior to saturation.

Recyclability of the Catalyst

The prepared catalysts were run through at least 4 cycles of absorption and regeneration before quantified tests were carried out on them. These initial cycles were found appropriate to stabilize the catalyst and obtain relatively consistent results in subsequent tests. Generally, the activity of the catalyst in terms of its decomposing capacity increased following these preliminary recyclings. The presence of oxygen at least in small amounts during the decomposition or regeneration phase of the process was found to be essential to restore the activity of the catalyst. It is believed that the catalyst oxidizes the non-sulphur components of the absorbed compounds using internally available oxygen. In the case of hydrogen sulphide, this results in the release of water. Oxygen is then required to replenish the oxygen so consumed.

No significant decline or loss of activity in dissociative capacity of the catalyst has been found despite a number of consecutive absorption and regeneration cycles so long as replacement oxygen is available. The absorptive capacity of the catalyst has been shown to remain relatively unchanged through at least 30-40 cycles of absorption and regeneration.

Effects of Carbon Dioxide, Water and Heavy Hydrocarbons

When carbon dioxide is present in the gas stream it does not substantially effect the capacity of the catalyst to absorb hydrogen sulphide.

When water is present in or exposed to the catalyst as a vapour component in a gas stream, the performance of the alumina supported catalyst in terms of absorptive capacity is somewhat enhanced. Water has not been found, however, to have a significant negative effect on the decomposing capacity of the catalyst.

When used to remove hydrogen sulphide from gas streams containing high boiling point hydrocarbons, contamination of the catalyst can occur. Prior scrubbing of the gas stream has been found necessary to reduce the effects of this problem.

Absorptive Capacity

The absorptive capacity of the catalyst (in terms of the ratio of the mass of hydrogen sulphide removed in the absorption stage to the mass of the catalyst) is relatively insensitive to the concentration of hydrogen sulphide in the gas stream for concentrations of hydrogen sulphide equal to or less than 10%. It rises, however, approximately linearly with total pressure, up to at least 500 psig.

At modest flow rate, the rate of removal of hydrogen sulphide by absorption in the case of alumina carriers is relatively high, up to the point where the catalyst bed has been nearly totally saturated with hydrogen sulphide at ambient temperature and pressure.

Some tests were done with a 3 minute residence time. Other tests were done with a 0.7 minute residence time. In both cases Alcoa alumina carriers impregnated with the necessary ingredients to form the catalyst were capable, before saturation, of removing virtually 100of the hydrogen sulphide from the gas stream. The level of hydrogen sulphide prior to breakthrough was below the threshold of measurability, in both cases being below 1 ppm.

Throughout the laboratory tests, nitrogen or methane containing small amounts of oxygen was used in most cases to regenerate the catalyst after the sulphur was driven-off using oxygen-free nitrogen or methane as the sweep gas. In some tests effected using a source of sour natural gas, the hydrogen sulphide absorptive capacity of catalysts (based on the Alcoa carrier) was similar to that obtained with the nitrogen. While quantitative measurements of decomposing capacity were not made in these latter tests, visual examination of the catalyst bed after exposure to sour natural gas and before regeneration showed clear deposits of yellow sulphur. From this it is concluded that the substitution of natural gas containing small amounts of oxygen for nitrogen or pure methane as the background gas and as the sweep gas does not significantly decrease the absorptive or dissociative capacity of the catalyst.

Other Sulphur Compounds

While tests have been carried out mainly on hydrogen sulphide as the decomposed sulphide, it is believed that the catalyst will be active in decomposing carbonyl sulphide, carbon disulphide, mono and dialkyl sulphides, alkyl-type disulphides and thiophene. It would also be suitable for removing all of the foregoing from a mixture of more complex natural gas components in gaseous or liquid phase, such as from butane or propane.

The foregoing disclosure has identified various features of the invention. These and further aspects of the invention, in its most general and more specific senses, are now described and defined in the claims which follow.

We claim:

1. A method of decomposing a sulphur-containing compound having a non-sulphur component from a gas gas stream containing such compound to produce elemental sulphur including contacting said gas with a catalyst composition deposited on a catalytic support, said composition comprising a mixture of at least two salts, the first of said salts comprising a sulphide or selenide of at least one metal selected from amphoteric or polyvalent metals, or mixtures thereof, the second of said salts being a sulphide or selenide of an alkali metal, and there being present at least one component capable of providing or generating reactive oxygen whereby said reactive oxygen is reactable with the non-sulphur component of said sulphur-containing compound to form sulphur;

followed by the step of regenerating said catalyst by heating it in the presence of an unreactive sweep gas containing a an amount of oxygen to drive off elemental sulphur and recondition the catalyst.

2. A method as in claim 1 wherein said support is selected from alumina, zeolites, molecular sieves, silica and char.

3. A method as in claim 1 wherein said support is adapted to absorb alkyl or hydrogen sulphide.

4. A method as in claim 1 wherein one of the salts is a sulphide.

5. A method as in claim 1 wherein both of said salts are sulphides.

6. A method as in claim 1 wherein said amphoteric or polyvalent metal is selected from the group consisting of zinc, manganese, iron, copper, cobalt, aluminum, vanadium, molybdenum, tin and nickel, and mixtures thereof.

7. A method as in claim 4, 5, or 6 wherein the alkali metal is selected from the group consisting of lithium, potassium, sodium, cesium and rubidium.

8. A method of sweetening a sour natural gas stream comprising providing a stream of a sour natural gas, containing at least one sulphur compound having a non-sulphur component and exposing said stream to an active catalytic composition deposited on a catalytic support wherein said composition contains a mixture of at least two salts, one of said salts comprising at least one sulphide or selenide of at least one metal selected from amphoteric or polyvalent metals, or mixtures thereof, the other of said salts being at least one sulphide or selenide of an alkali metal, there being present in said catalytic support and associated with said catalytic composition, independently of said gas stream, internally available reactive oxygen whereby said reactive oxygen is reactable with the non-sulphur component of said sulphur-containing compound to form sulphur.

9. A method of sweetening a sour natural gas stream comprising providing a stream of a sour natural gas, containing at least one sulphur compound having a non-sulphur component and exposing said stream to an active catalytic composition deposited on a catalytic support wherein said composition is obtained by treating said support with a mixture of at least two salts, one of said salts comprising at least one sulphide or selenide of at least one metal selected from amphoteric or polyvalent metals, or mixtures thereof, the other of said salts being at least one sulphide or selenide of an alkali metal drying said support once so treated, then conditioning said composition by exposure of said support to a stream of hydrogen sulphide, then removing excess sulphur by heating said support in the presence of a sweep gas, and exposing said support to an amount of oxygen in order to conclude the conditioning, there being present reactive oxygen whereby said reactive oxygen is reactable with the non-sulphur component of the sulphur-containing compound to form sulphur.

10. A method of producing sulphur from a composition containing a sulphur compound having a non-sulphur component comprising providing a source of a composition containing a sulphur compound having a non-sulphur component, exposing said source to an active catalytic substance deposited on a catalytic support wherein said substance contains a mixture of at least two salts, one of said salts comprising at least one sulphide or selenide of at least one metal selected from amphoteric or polyvalent metals, or mixtures thereof, the other of said salts being at least one sulphide or selenide of an alkali metal, there being present in said catalytic support and associated with said catalytic substance, independently of said source, internally available reactive oxygen whereby said reactive oxygen reacts with the non-sulphur component of said sulphur-containing compound to form sulphur, and recovering the resulting sulphur produced thereby.

11. A method of producing sulphur from a substance containing a sulphur compound having a non-sulphur component comprising providing a source of a substance containing a sulphur compound having a non-sulphur component, exposing said source to an active catalytic composition deposited on a catalytic support wherein said composition is obtained by treating said support with a mixture of at least two salts, one of said salts comprising at least one sulphide or selenide of at least one metal selected from amphoteric or polyvalent metals, or mixtures thereof, the other of said salts being at least one sulphide or selenide of an alkali metal, drying said support once so treated, then conditioning said composition by exposure of said support to a stream of hydrogen sulphide, then removing excess sulphur by heating said support in the presence of a sweep gas and, exposing said support to an amount of oxygen in order to conclude the conditioning, there being present reactive oxygen whereby said reactive oxygen is reactable with the non-sulphur component of the sulphur-containing compound to form sulphur, and recovering the resulting sulphur produced thereby.

12. A method, as defined in claim 10 or 11, wherein said source comprises a gaseous source.

13. A method as defined in claim 10 or 11, wherein said source comprises a sour natural gas.

* * * * *